United States Patent [19]
Armstrong et al.

[11] Patent Number: 5,729,219
[45] Date of Patent: Mar. 17, 1998

[54] SELECTIVE CALL RADIO WITH CONTRAPOSED TOUCHPAD

[75] Inventors: Douglas L. Armstrong; Stephen W. Braun, both of Atlanta; Bradley M. Wilkinson, Decatur, all of Ga.

[73] Assignee: Motorola, Inc., Schaumburg, Ill.

[21] Appl. No.: 691,764

[22] Filed: Aug. 2, 1996

[51] Int. Cl.[6] .................................................. H03K 17/94
[52] U.S. Cl. .......................... 341/20; 341/26; 341/34; 345/173; 340/825.44
[58] Field of Search ............................. 341/20, 22, 23, 341/26, 28, 34, 175, 176; 345/173; 340/825.44; 361/680, 681; 455/352; 178/18

[56] References Cited

U.S. PATENT DOCUMENTS

| | | | |
|---|---|---|---|
| 4,129,747 | 12/1978 | Pepper et al. | 178/19 |
| 4,302,011 | 11/1981 | Pepper et al. | 273/85 |
| 4,853,494 | 8/1989 | Suzuki | 341/23 |
| 4,916,441 | 4/1990 | Gombrich | 340/712 |
| 5,182,553 | 1/1993 | Kung | 340/825.44 |
| 5,329,577 | 7/1994 | Norimatsu | 341/22 |
| 5,379,030 | 1/1995 | Nolan et al. | 340/825.03 |
| 5,459,458 | 10/1995 | Richardson et al. | 340/825.52 |
| 5,469,194 | 11/1995 | Clark et al. | 345/173 |

FOREIGN PATENT DOCUMENTS

| | | | |
|---|---|---|---|
| 2714874 | 10/1978 | Germany | 455/352 |
| 91/16771 | 10/1991 | WIPO | 340/825.44 |

OTHER PUBLICATIONS

US Patent Application Serial No. 08/461,610, "Combination Information Display and Proximity Sensing Apparatus," filed Jun. 5, 1995 by Rasor.

*Primary Examiner*—Jeffery Hofsass
*Assistant Examiner*—Andrew Hill

[57] ABSTRACT

A selective call radio (10), including a housing (12), has a display (18) and touchpad (22) of the same size. The display is mounted to a surface on one side of the housing, and the touchpad is mounted to another surface on an opposite side of the housing, directly opposite the display. A screen surface of the display and a touch surface of the touchpad are parallel and have a same number of edges. Sliding of a user's fingertip on the touchpad in a right-to-left direction causes movement of a pointer (26) in a left-to-right direction, and vice versa. Movement on the touchpad causes movement in an identical amount on the display.

9 Claims, 3 Drawing Sheets

SELECTIVE CALL RADIO WITH CONTRAPOSED TOUCHPAD

FIELD OF THE INVENTION

This invention relates in general to selective call radios and more specifically to a selective call radio having a touchpad.

BACKGROUND OF THE INVENTION

Selective call radios generally include a display and one or more buttons to control information appearing on the display. Recently, the display on selective call radios has become more computer-like in appearance and function, i.e., displays have become larger, have comprised more pixels, have used graphical user interfaces (GUIs), including icons, and have included movable cursor-like objects called pointers. Accordingly, there has arisen the need to control the movement of the pointer to select among the icons and words appearing on the display.

Well known is the use of a set of four buttons for movement of the pointer in the up, down, left, and right directions, respectively. Also, known is the mounting of a trackball or a mouse on a portable display device. See, for example, World Intellectual Property Organization international publication number WO 91/1677, entitled *Portable Graphic Display Having Integral Display Movement Tracking*, by DeLuca, et al., published 31 Oct. 1991. In addition, a portable transceiver having a touch screen is known. See, for example, U.S. Pat. No. 4,916,441, entitled *Portable Handheld Terminal*, issued Apr. 10, 1990 to Gombrich. Further, a two-way acknowledge-back pager utilizing touch sensitive technology in association with a GUI is described in U.S. Pat. No. 5,459,458, entitled *Virtual Pager for General Purpose Data Terminal*, issued Oct. 17, 1995 to Richardson, et al., and assigned to the assignee of the present invention.

Touchpads on portable computers are well known. See, for example, U.S. Pat. No. 5,469,194, entitled *Apparatus and Method for Provided Different Input Device Orientations of a Computer System*, issued Nov. 21, 1995 to Clark, et al. However, touchpads on known portable computers are mounted on a surface on the same side of the portable computer housing as is mounted the display screen, such that both the display screen and the touchpad are visible to the user. Further, touchpads on portable computers are coupled to display screens such that movement from left-to-right on the touchpad corresponds to movement in the same direction on the display screen. Some touchpads are detached and separate from an associated display screen. However, neither known detached touchpads, nor known touchpads fixed to a device with a display, has any provision for reversing the effect of movement along one of the axes of the touchpad. Also, touchpads and display screens on known portable computers are of dissimilar size, thereby, disadvantageously, not allowing movement on the touchpad to be on the identical scale as movement on the display screen.

Thus, what is needed is a selective call radio having a display screen, or display, and a touchpad for efficiently controlling the movement of a pointer, or cursor-like object, appearing on the display.

DESCRIPTION OF THE PREFERRED EMBODIMENT

Figure 1:
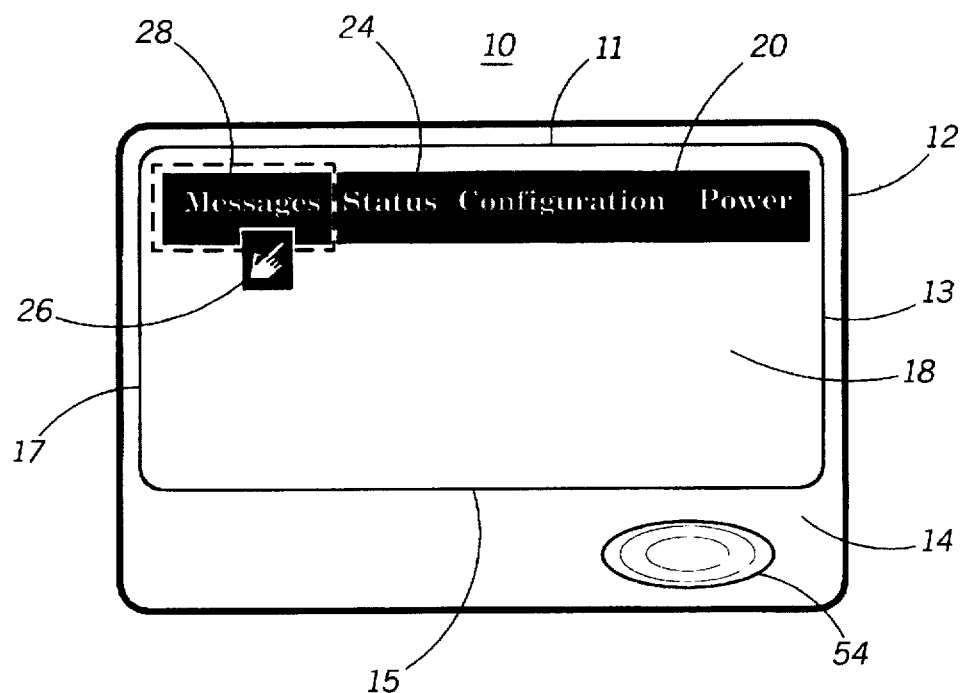
FIG. 1 is a front view of a selective call radio showing a pointer of an exemplary simplified graphical user interface (GUI) on a display in accordance with the preferred embodiment of the present invention.

FIG. 1 is a front view of a selective call radio 10 comprising a selective call radio housing 12. The housing 12 has a first surface 14, i.e., the front, and a second surface 16, i.e., the rear, shown in FIG. 2. The first surface and the second surface are on opposite sides of the housing.

A battery powered, portable selective call radio 10, such as, for example, a one-way pager or a two-way pager, operates to receive a radio frequency signal via an antenna. The selective call radio 10 includes a receiver that couples the received signal to a demodulator, which recovers any embedded information using conventional techniques. The recovered information is coupled to a controller that interprets and decodes the recovered information. The controller typically comprises a microprocessor having a signal processor (decoder) implemented in both hardware and software. In a manner that is well known in the art, the recovered information is checked by the decoder, which implements the signal processor that correlates a recovered address with a predetermined address stored in the selective call radio's non-volatile memory. The non-volatile memory typically has a plurality of registers for storing a plurality of configuration words that characterize the operation of the selective call radio. The selective call radio selects a message by performing a correlation between a predetermined address associated with the selective call radio and a received address. When the addresses correlate, the controller couples message information to the message memory. The selective call radio includes a display 18 mounted to the first surface 14 of the selective call radio housing 12. In response to the recovered information and to settings associated with user controls, the selective call radio includes a means for generating an image capable of being presented on the display 18 that presents the message information, and means for signaling the user via an audible or tactile alert that a message has been received. The display 18 is preferably comprised of a liquid crystal display (LCD) screen of one-eighth standard video graphics array (VGA) resolution. Software, stored in the non-volatile memory and executed by the microprocessor, produces a graphical user interface 20 (GUI) on the display 18. The operation of a selective call radio is well known to those skilled in the art; however, the operation of a selective call radio with a display is more fully described in U.S. patent application Ser. No. 08/461,610, entitled *Combination Information Display and Proximity Sensing Apparatus*, filed Jun. 5, 1995 by Rasor, in U.S. Pat.

No. 5,182,553, entitled *Communication Receiver Providing Displayed Operating Instructions*, issued Jan. 26, 1993 to Kung, and in U.S. Pat. No. 5,379,030, entitled *User Friendly Channel Selection in a Selective Call Receiver and Method Therefor*, issued Jan. 3, 1995 to Nolan, et al., all of which are assigned to the assignee of the present invention, and each of which are hereby fully incorporated by reference herein.

Figure 2:
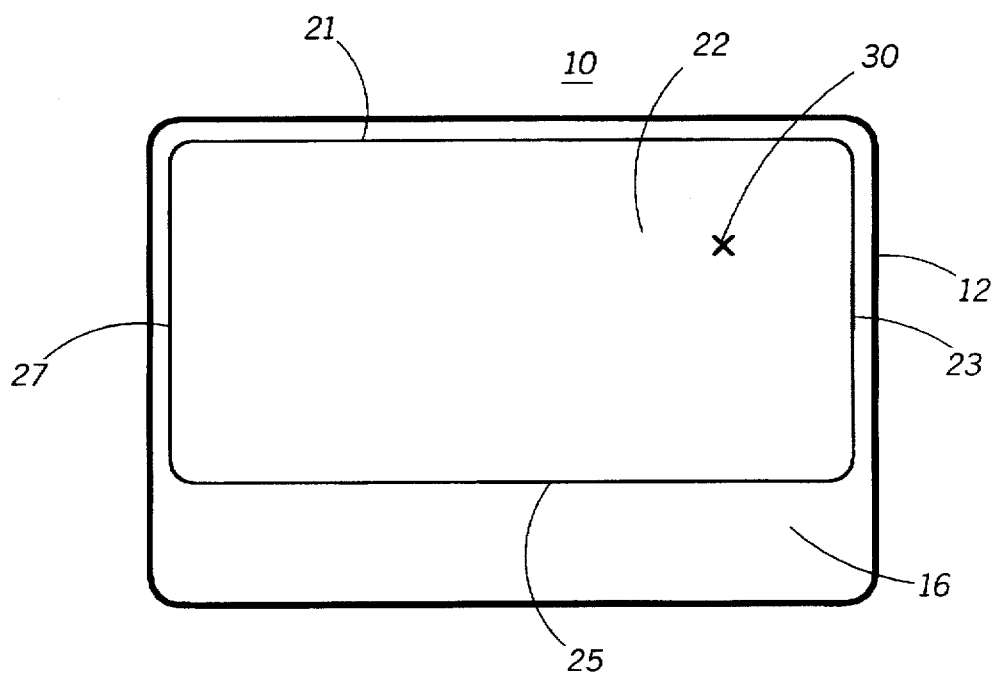
FIG. 2 is a rear view of the selective call radio showing a touchpad and a position "x" on the touchpad corresponding to the pointer of FIG. 1.

Referring now to FIG. 2, in accordance with the invention, the selective call radio 10 includes a touchpad 22 mounted to the second surface 16 of the selective call radio housing 12. Unlike known selective call radios having touch screens which disadvantageously tend to become dirty and oily due to frequent touching, the display 18 of the selective call radio 10 in accordance with the invention does not tend to become dirty or oily because it is the touchpad 22, and not the screen, which is touched. Referring now to FIG. 1 and FIG. 2, the display 18 has a plurality of edges 11, 13, 15 and 17 and the touchpad has a same number of corresponding edges 21, 23, 25 and 27, and each of the plurality of edges of the display are parallel to each of the corresponding edges of the touchpad.

The touchpad 22, the display 18, and the controller (not shown) are coupled through means for interconnecting and comprise a system that produces a mirror-image mapping of points on the touchpad with corresponding points on the display. Comparison of the display 18 shown in FIG. 1 with the touchpad 22 shown in FIG. 2 shows the mirror-image mapping. As a result of the mirror-image mapping, a left-to-right touching movement on the touchpad produces to a right-to-left GUI pointer movement on the display. FIG. 1 shows an exemplary menu title bar 24 with a pointer 26 positioned at the title "Messages" 28 on the left of the display. FIG. 2 shows a position 30, indicated by an "X" on the opposite, right side of the touchpad, that corresponds to the pointer being at the word "Messages". This mapping, in accordance with the invention, differs from the mapping of points on touchpads mounted in the prior art manner (i.e., the mounting of a touchpad on the same side of a device as an associated display). This novel mapping of points on the touchpad is accomplished preferably through the use of hardware changes in the coupling between the touchpad and the display; alternatively, the mapping is accomplished through the use of software elements stored in non-volatile memory or in firmware, and executed by the microprocessor. Because touchpads have, in the prior art, been mounted to the same side of a device as the associated display, both the display and touchpad were visible at the same time to a user. A touchpad mounted to a selective call radio housing in accordance with the invention, however, is not visible to a user at the same instant that the user is viewing the display, and this feature provides unforeseen benefits as herein below described.

Figure 3:
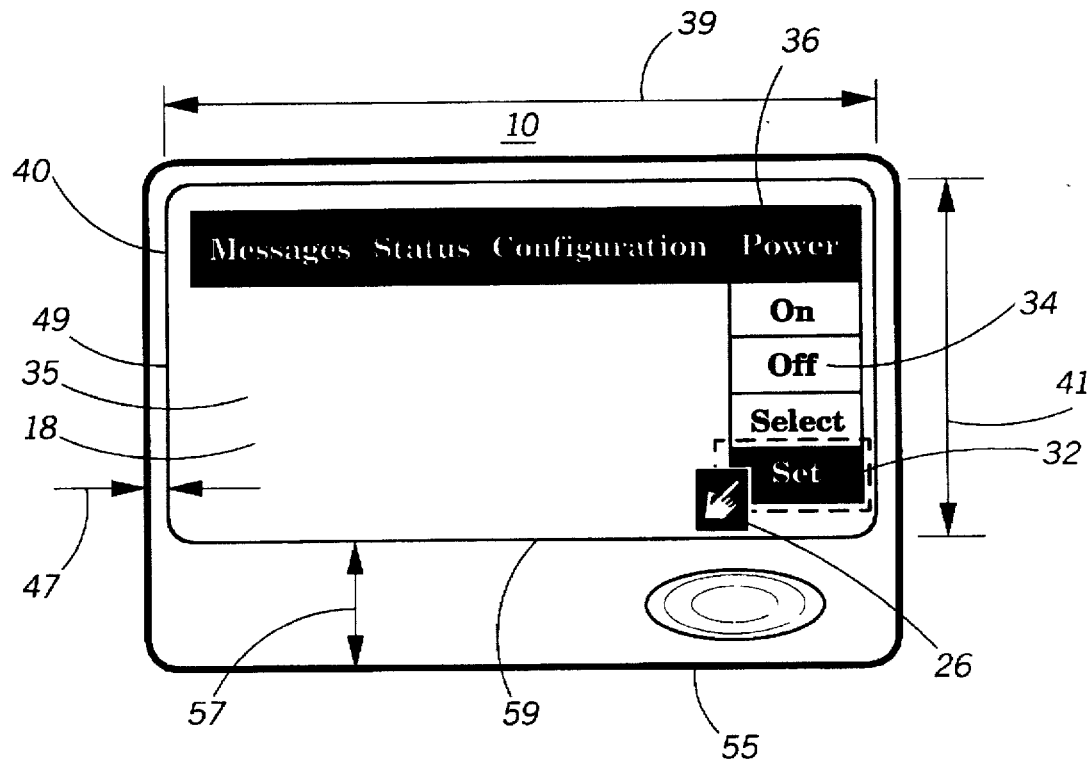
FIG. 3 is front view of the selective call radio showing the pointer at another position on the exemplary simplified GUI of FIG. 1.
Figure 4:
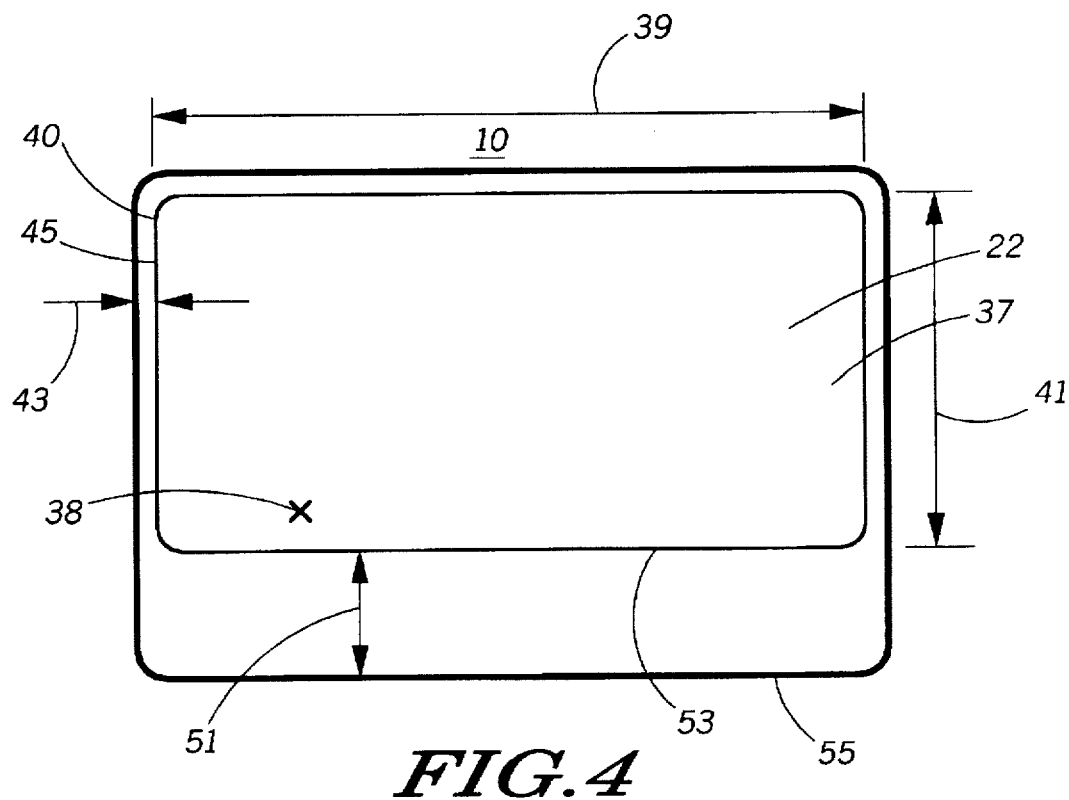
FIG. 4 is a rear view of the selective call radio showing the touchpad and another position "x" on the touchpad corresponding to the position of the pointer shown in FIG. 3.

FIG. 3, together with FIG. 4, show another example of the mirror-image mapping of the touchpad 22 and display 18 relative to an axis of the touchpad and an associated axis on the display. In the preferred embodiment, the component of coordinates along longitudinal axes of the substantially rectangular touchpad and display are reversed. As a result, a component of touching movement on the touchpad along its longitudinal axis produces a component of movement of the pointer on the display along the display's longitudinal axis, but in a reverse direction. FIG. 3 shows the pointer 26 at the word "Set" 32 of a pulldown menu 34 under the category "Power" 36 appearing on the right side of the display. FIG. 4 shows a position 38, indicated by an "X" on the left side of the touchpad, that corresponds to the pointer being at the word "Set". It should be understood that the simplified GUI shown in FIGS. 1, 3, 5 and 6 is for illustrative purposes only. A selective call radio 10 in accordance with the invention alternatively uses a more complicated GUI with icons, including animated icons.

Figure 5:
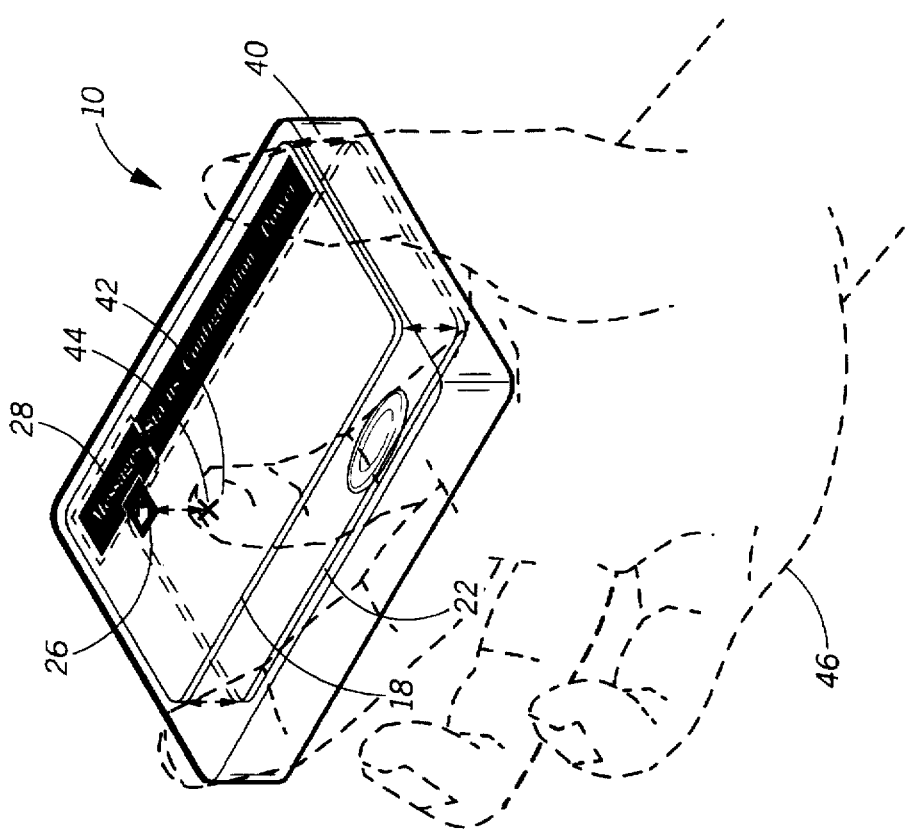
FIG. 5 is a perspective view of the selective call radio showing the GUI with the pointer at the position shown in FIG. 1, and a finger of a user's hand contacting the touchpad at the position "x" shown in FIG. 2.

Referring now to FIGS. 3 and 4, the display 18 comprises a rectangular, substantially flat screen surface 35 having a length 39 and width 41, and the touchpad comprises a rectangular, substantially flat touch surface 37 having the same length 39 and the same width 41. In known devices having a display and a touchpad, the touchpad is substantially smaller than the screen which, in turn, requires some hardware or software means to scale shorter movement on the touchpad with longer movement on the display. On the other hand, a selective call radio in accordance with the invention advantageously does not require any such means to scale movement between the display and the touchpad because they have the same dimensions. Further, in accordance with the invention, the display 18 and the touchpad 22 are mounted on opposite surfaces 14 and 16, respectively, of the housing 12. Preferably, the display and the touchpad are mounted directly opposite each other. As shown in FIG. 5, the selective call radio housing 12 comprises at least one additional surface 40, adjacent to both the first surface and the second surface. Referring again to FIGS. 3 and 4, both the touchpad and the display are mounted to the housing such that a distance 43 between an edge 45 of the touchpad and the at least one additional surface 40 is substantially equal to a distance 47 between the corresponding edge 49 of the display screen and the at least one additional surface 40. Similarly, the touchpad and the display are mounted to the housing such that another distance 51 between another edge 53 of the touchpad and another surface 55 of the at least one additional surface 40 is substantially equal to a distance 57 between the corresponding edge 59 of the display screen and the other surface 55 of the least one additional surface 40. Unlike known housings having provision for a touchpad, and which have the touchpad and display adjacent to each other, a housing in accordance with the invention advantageously has the touchpad contraposed to the display.

Figure 6:
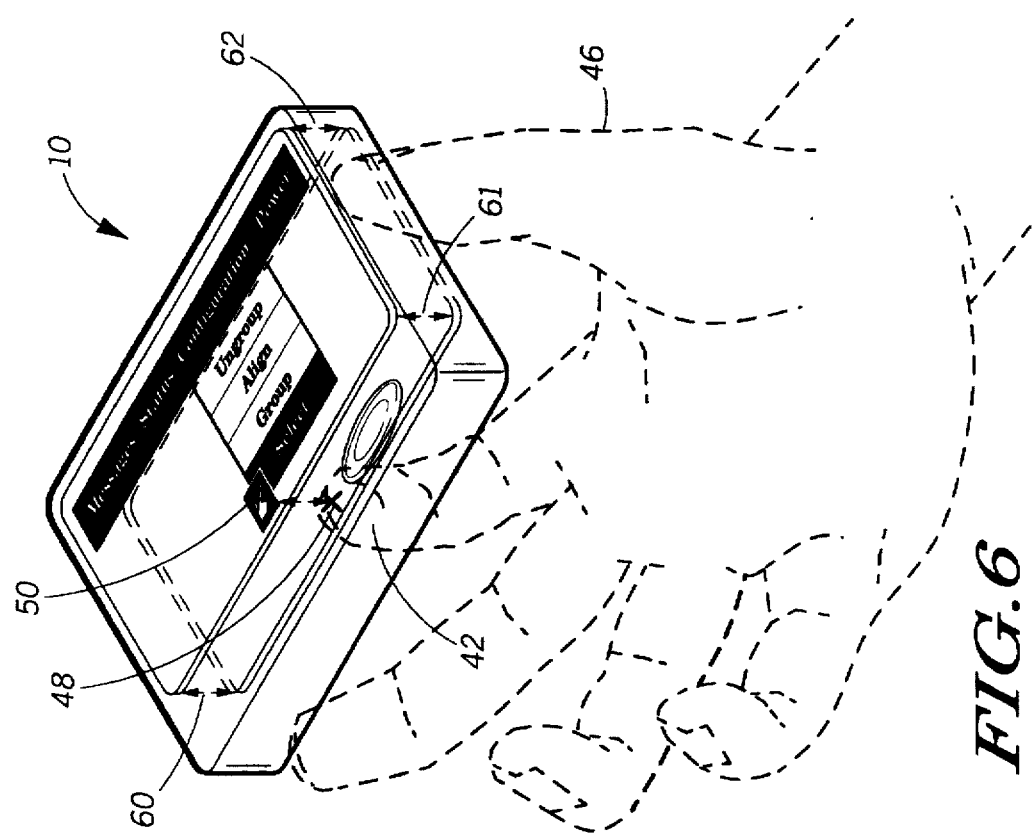
FIG. 6 is a perspective view of the selective call radio showing the GUI with the pointer at a third position, and a finger of a user's hand contacting the touchpad at a corresponding third position "x".

Referring now to FIG. 5, the user navigates within the GUI, including selectively viewing messages on the display 18, through the use of the touchpad 22. The operation of a touchpad 22 to control a pointer on a GUI is well known, and a description of the operation of a touchpad is described in U.S. Pat. No. 4,129,747, entitled *Human-Machine Interface Apparatus*, issued Dec. 12, 1978 to Pepper, and in U.S. Pat. No. 4,302,011, entitled *Video Game Apparatus and Method*, issued Nov. 24, 1981 to Pepper, which are hereby fully incorporated by reference herein. FIGS. 5 and 6 show, in phantom, a hand 46 of a user holding a selective call radio and operating the touchpad in accordance with the invention. Typically, a fingertip 42 of a user is put in contact with the touchpad 22 which produces a signal corresponding to the Cartesian coordinates of a point 44 of contact. In FIG. 5, for example, the user's fingertip is under the word "Messages" 28 in the menu title bar 24, and, in accordance with the invention, the pointer 26, which in this example is a hand icon, appears at the word "Messages". The invention does not require the appearance of a separate pointer, such as the hand icon; rather, the word "Messages" is alternatively highlighted in any other manner, such as with inverse contrast, when the fingertip of a user is in contact with the touchpad at a point 44 directly under the word "Messages". The value of the signal changes in accordance with changing coordinates as the fingertip 42 is slid to, or otherwise positioned at, another point 48 (see FIG. 6) on the touchpad 22. In FIG. 6, the user's fingertip 42 is at a point 48 on the touchpad on the rear of the housing directly opposite a point 50 on the display on the front of the housing near the word "Select" 52 of a pull-down menu. As the pointer is moved, a word or icon is typically highlighted when the pointer is within a predetermined zone near the word or icon. In FIG. 6, for example, the word "Select" 52 is shown highlighted. Preferably, the touchpad is directly contraposed from the display as indicated by arrows 60, 61 and 62, the double arrowheads of each arrow pointing to matching corners of the display and touchpad, respectively.

Referring again to FIG. 1, the selective call radio includes a button 54 on the housing 12 accessible to the user for use with the touchpad 22. The button 54 is used to activate the operation symbolized by a word or icon at which the pointer is positioned. Alternatively, the button 54 also acts as an "on" switch, and the selective call radio 10 automatically turns itself off after a preselected period of inactivity.

In summary, a selective call radio housing is shown with a touchpad matching a display in both size and shape, and mounted to a surface of the housing directly opposite the display. The placement of the identically sized touchpad directly opposite the display has the unexpected result of the display and the touchpad feeling to a user as being a single unit. Advantageously, when a user slides a fingertip across the contraposed touchpad, it unexpectedly feels to the user as if the user's fingertip is touching and sliding across the back of the display itself.

While a detailed description of the preferred embodiment of the invention has been given, it should be appreciated this invention can be realized in a number of embodiments, of which the disclosed embodiment is only one alternative, without departing from the scope of the invention as set forth in the appended claims. For example, the housing, display, and touchpad shown in the preferred embodiment are rectangular; however, it is foreseen that they can be shaped otherwise. As a specific alternative example, the housing can be round, the screen surface and touch surface can be circular, the means for interconnecting can utilize polar coordinates, and there need be only one additional surface 40, which can be cylindrical in shape.

We claim:

1. A selective call radio, comprising:

a housing having a first surface and a second surface, the first surface being approximately parallel to the second surface;

a display mounted to the housing at the first surface; and a touchpad mounted to the housing at the second surface.

2. The selective call radio of claim 1, in which dimensions of the display and dimensions of the touchpad are substantially identical.

3. The selective call radio of claim 2, in which the display has a plurality of edges and the touchpad has a same number of corresponding edges and each of the plurality of edges of the display are parallel to each of the corresponding edges of the touchpad.

4. The selective call radio of claim 3 in which the housing has at least one additional surface adjacent to both the first surface and the second surface, and the touchpad is mounted such that a distance between an edge of the touchpad and the at least one additional surface is substantially equal to the distance between a corresponding edge of the display and the at least one additional surface.

5. A selective call radio housing having a first surface and a second surface, the second surface being opposite the first surface, comprising:

a display mounted on the first surface, the display having a substantially flat screen surface; and a touchpad mounted on the second surface, the touchpad having a substantially flat touch surface.

6. The selective call radio housing of claim 5 in which the screen surface is substantially parallel to the touch surface.

7. The selective call radio housing of claim 6, in which the touchpad is mounted directly opposite the display.

8. The selective call radio housing of claim 7 in which dimensions of the display and dimensions of the touchpad are substantially identical.

9. A system for controlling a selective call radio, comprising:

a selective call radio housing;

a touchpad fixed to the selective call radio housing and electrically coupled to the selective call radio, the touchpad having an axis;

a display for displaying a pointer of a graphical user interface, the display fixed to the selective call radio housing and electrically coupled to the selective call radio, the display having a corresponding axis; and means for interconnecting the display and the touchpad such that a component of touching movement on the touchpad along the axis produces a component of movement of the pointer on the display along the corresponding axis in a reverse direction.

* * * * *

UNITED STATES PATENT AND TRADEMARK OFFICE
CERTIFICATE OF CORRECTION

PATENT NO. : 5,729,219
DATED : March 17, 1998
INVENTOR(S) : Armstrong et al.

It is certified that error appears in the above-indentified patent and that said Letters Patent is hereby corrected as shown below:

The title page, should be deleted to appear as per attached title page.

Signed and Sealed this

Thirtieth Day of November, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO : 5,729,219

DATED : March 17, 1998

INVENTOR(S): Armstrong et al.

It is certified that error appears in the above-identified patent and that said Letters Patent is hereby corrected as shown below:

Please amend the drawings as follows:

FIG. 1: Squigglely line added to end of the reference arrow for reference number 14 to indicate that the reference arrow points to a surface.

FIG. 2: Squigglely line added to end of the reference arrow for reference number 16 to indicate that the reference arrow points to a surface.

FIG. 3: The reference arrow for reference number 40 has been shortened.

FIG. 4: The reference arrow for reference number 40 has been shortened.

FIG. 5: Squigglely line added to the end of the reference arrow for reference number 40 to indicate that the reference arrow points to a surface.

FIG. 6: Reference numbers 52 and 55 added to the figure.

Copies of the conformed drawings are attached.

United States Patent [19]

Armstrong et al.

[11] Patent Number: 5,729,219
[45] Date of Patent: Mar. 17, 1998

[54] SELECTIVE CALL RADIO WITH CONTRAPOSED TOUCHPAD

[75] Inventors: Douglas L. Armstrong; Stephen W. Braun, both of Atlanta; Bradley M. Wilkinson, Decatur, all of Ga.

[73] Assignee: Motorola, Inc., Schaumburg, Ill.

[21] Appl. No.: 691,764

[22] Filed: Aug. 2, 1996

[51] Int. Cl.$^6$ ............................................. H03K 17/94
[52] U.S. Cl. ........................... 341/20; 341/26; 341/34; 345/173; 340/825.44
[58] Field of Search ................................. 341/20, 22, 23, 341/26, 28, 34, 175, 176; 345/173; 340/825.44; 361/680, 681; 455/352; 178/18

[56] References Cited

U.S. PATENT DOCUMENTS

| | | | |
|---|---|---|---|
| 4,129,747 | 12/1978 | Pepper et al. | 178/19 |
| 4,302,011 | 11/1981 | Pepper et al. | 273/85 |
| 4,853,494 | 8/1989 | Suzuki | 341/23 |
| 4,916,441 | 4/1990 | Gombrich | 340/712 |
| 5,182,553 | 1/1993 | Kung | 340/825.44 |
| 5,329,577 | 7/1994 | Norimatsu | 341/22 |
| 5,379,030 | 1/1995 | Nolan et al. | 340/825.03 |
| 5,459,458 | 10/1995 | Richardson et al. | 340/825.52 |
| 5,469,194 | 11/1995 | Clark et al. | 345/173 |

FOREIGN PATENT DOCUMENTS

| | | | |
|---|---|---|---|
| 2714874 | 10/1978 | Germany | 455/352 |
| 91/16771 | 10/1991 | WIPO | 340/825.44 |

OTHER PUBLICATIONS

US Patent Application Serial No. 08/461,610, "Combination Information Display and Proximity Sensing Apparatus," filed Jun. 5, 1995 by Rasor.

*Primary Examiner*—Jeffery Hofsass
*Assistant Examiner*—Andrew Hill

[57] ABSTRACT

A selective call radio (10), including a housing (12), has a display (18) and touchpad (22) of the same size. The display is mounted to a surface on one side of the housing, and the touchpad is mounted to another surface on an opposite side of the housing, directly opposite the display. A screen surface of the display and a touch surface of the touchpad are parallel and have a same number of edges. Sliding of a user's fingertip on the touchpad in a right-to-left direction causes movement of a pointer (26) in a left-to-right direction, and vice versa. Movement on the touchpad causes movement in an identical amount on the display.

9 Claims, 3 Drawing Sheets

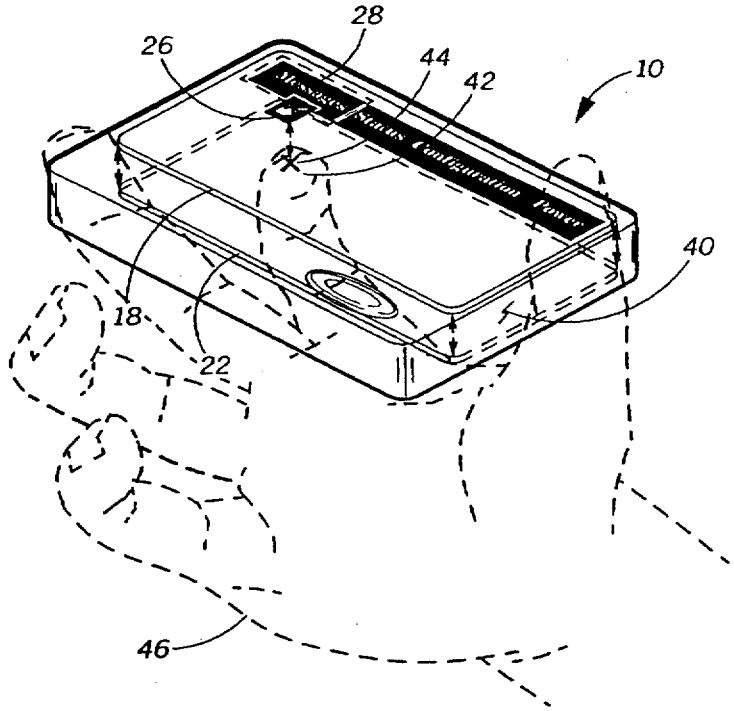

UNITED STATES PATENT AND TRADEMARK OFFICE
CERTIFICATE OF CORRECTION

PATENT NO : 5,729,219
DATED : March 17, 1998
INVENTOR(S): Armstrong et al.

It is certified that error appears in the above-identified patent and that said Letters Patent is hereby corrected as shown below:

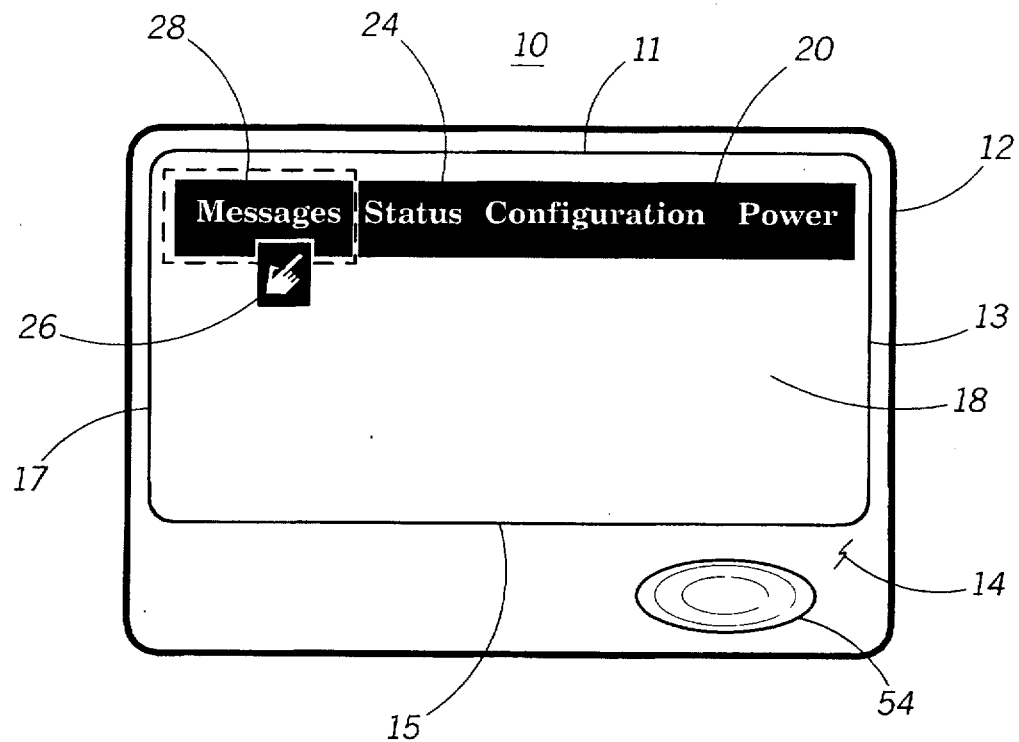

*FIG.1*

UNITED STATES PATENT AND TRADEMARK OFFICE
CERTIFICATE OF CORRECTION

PATENT NO : 5,729,219
DATED : March 17, 1998
INVENTOR(S): Armstrong et al.

It is certified that error appears in the above-identified patent and that said Letters Patent is hereby corrected as shown below:

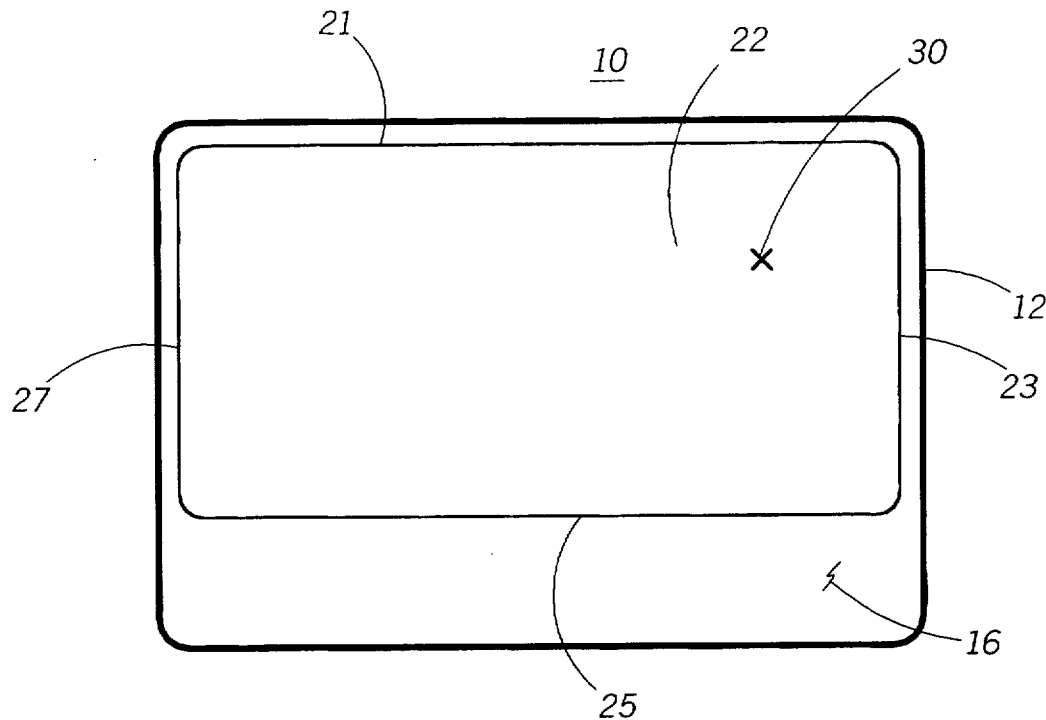

*FIG.2*

UNITED STATES PATENT AND TRADEMARK OFFICE
CERTIFICATE OF CORRECTION

PATENT NO : 5,729,219
DATED : March 17, 1998
INVENTOR(S): Armstrong et al.

Page 6 of 9

It is certified that error appears in the above-identified patent and that said Letters Patent is hereby corrected as shown below:

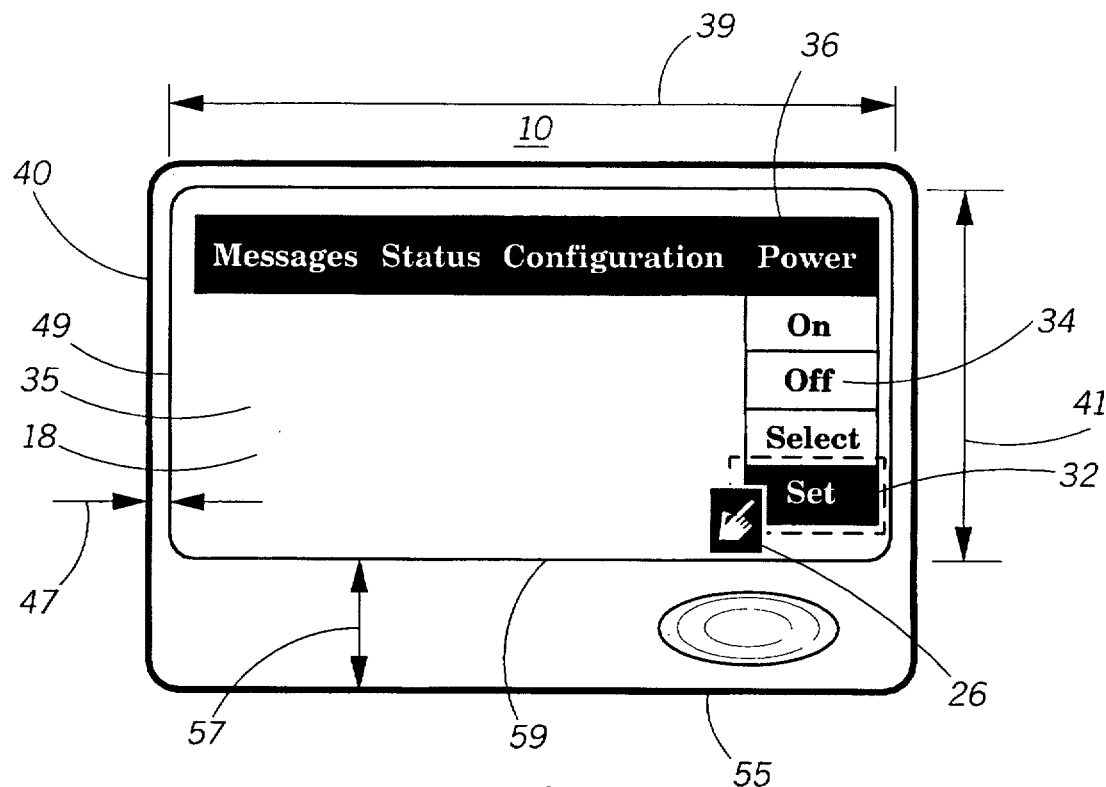

FIG.3

UNITED STATES PATENT AND TRADEMARK OFFICE
CERTIFICATE OF CORRECTION

PATENT NO : 5,729,219

DATED : March 17, 1998

INVENTOR(S): Armstrong et al.

It is certified that error appears in the above-identified patent and that said Letters Patent are hereby corrected as shown below:

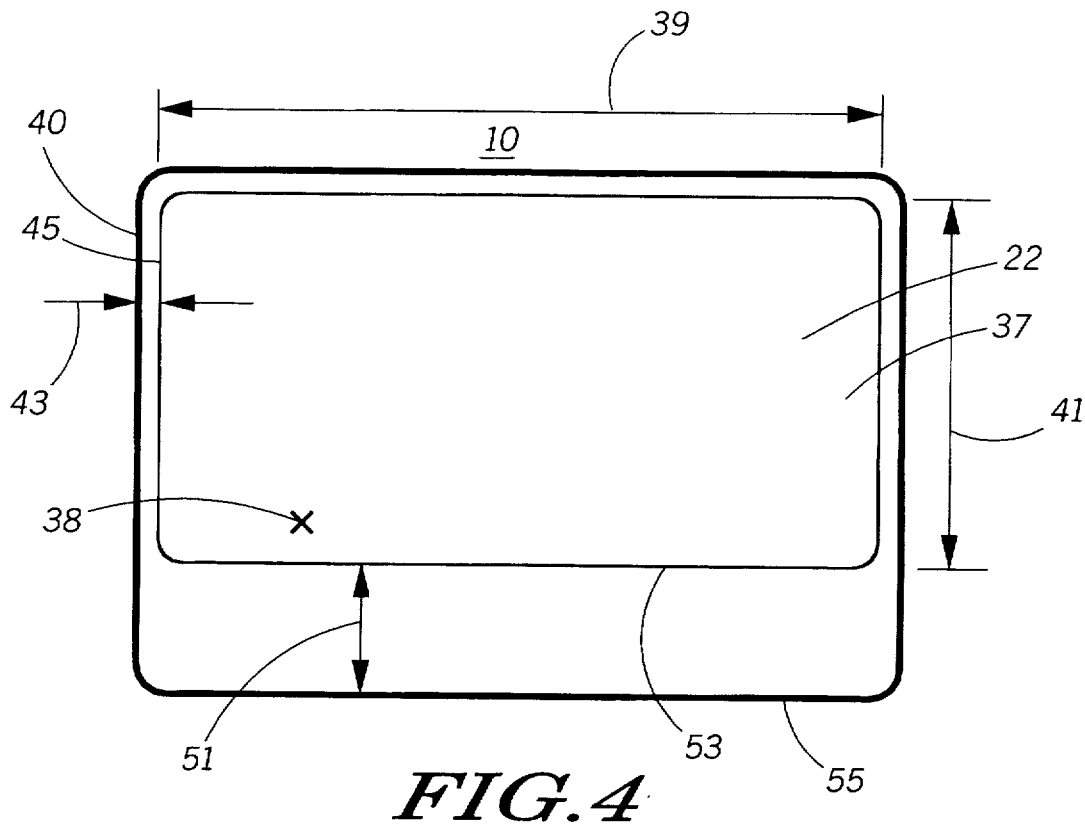

FIG.4

UNITED STATES PATENT AND TRADEMARK OFFICE
CERTIFICATE OF CORRECTION

PATENT NO : 5,729,219  
DATED : March 17, 1998  
INVENTOR(S): Armstrong et al.

Page 8 of 9

It is certified that error appears in the above-identified patent and that said Letters Patent is hereby corrected as shown below:

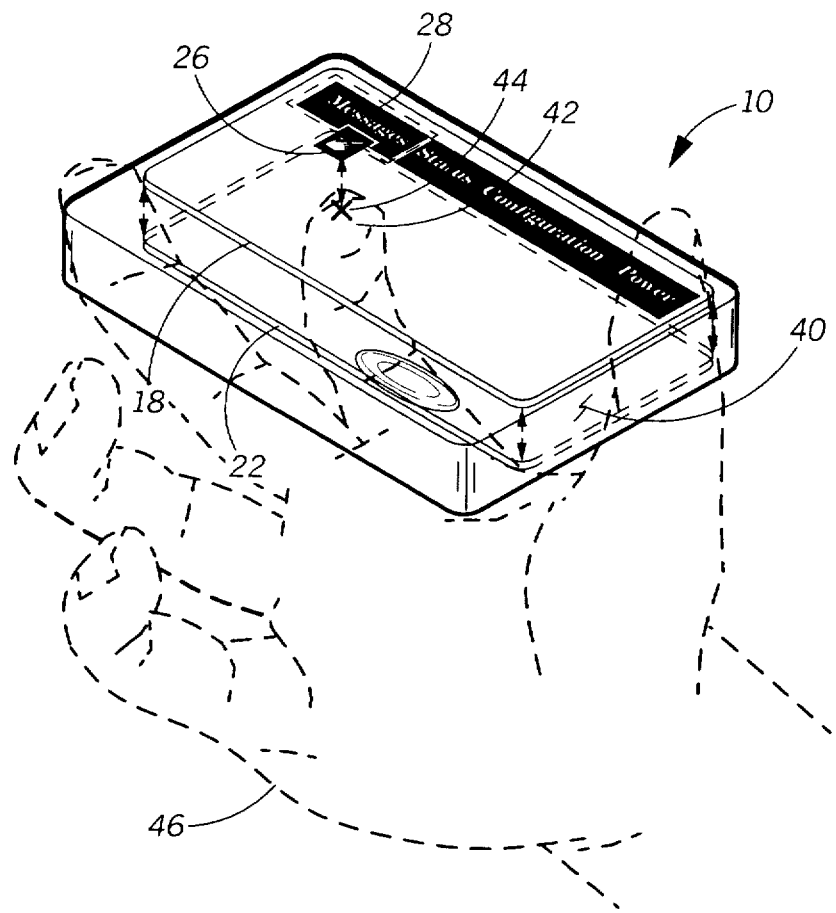

*FIG.5*

UNITED STATES PATENT AND TRADEMARK OFFICE
CERTIFICATE OF CORRECTION

PATENT NO : 5,729,219
DATED : March 17, 1998
INVENTOR(S): Armstrong et al.

It is certified that error appears in the above-identified patent and that said Letters Patent is hereby corrected as shown below:

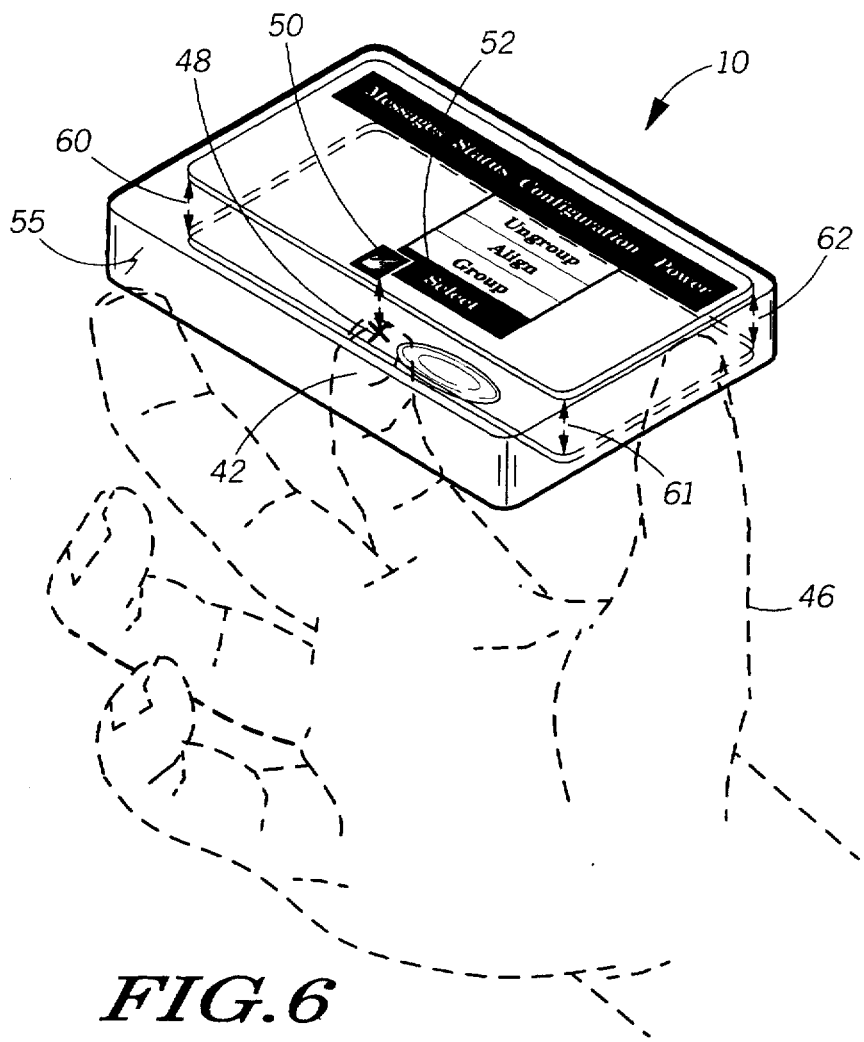

FIG.6